J. HARRIS.
DRAW BAR AND YOKE CONNECTION.
APPLICATION FILED SEPT. 2, 1915.
1,231,017.
Patented June 26, 1917.
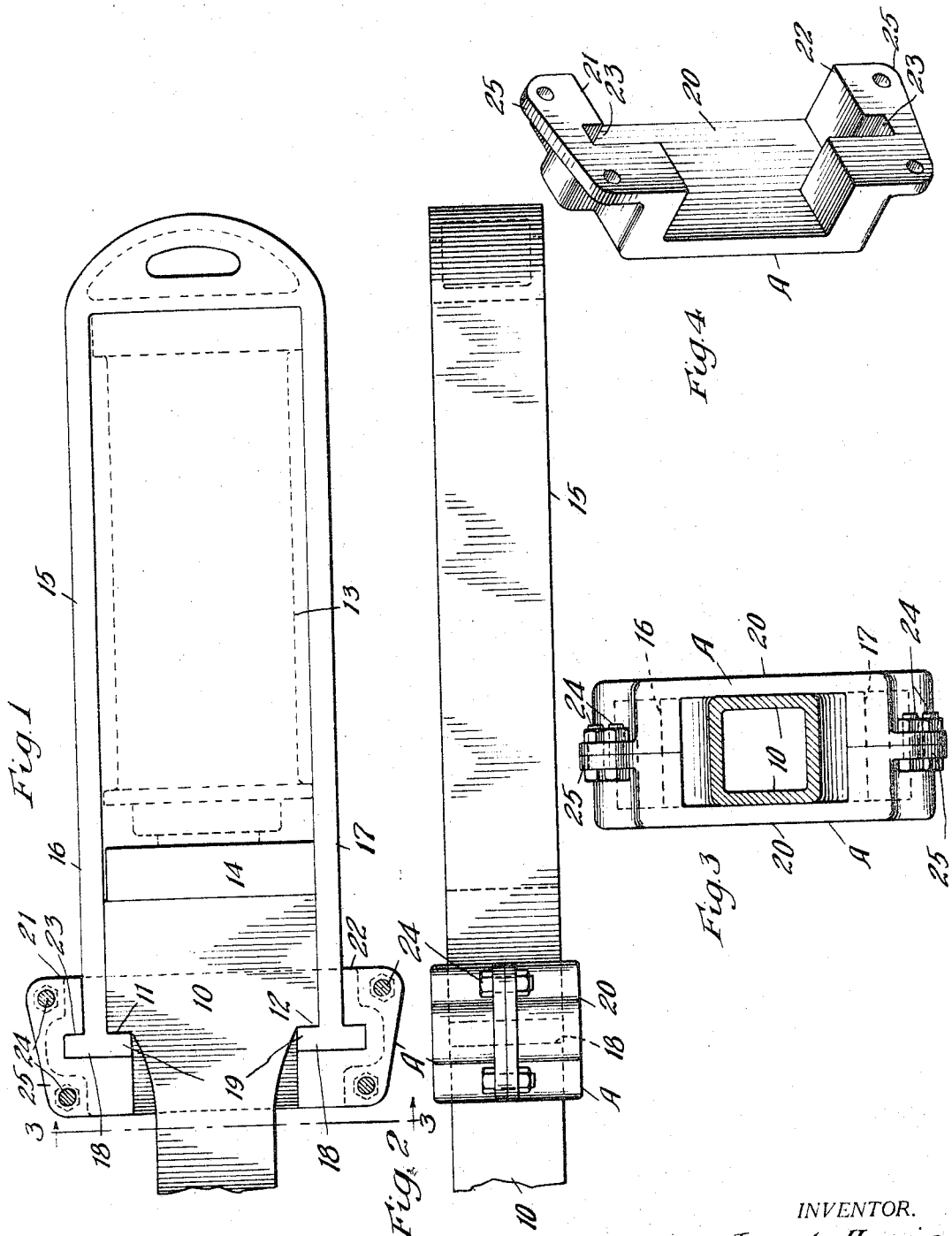
WITNESS
Wm. Geiger
INVENTOR.
Joseph Harris
BY George D. Haight
ATTORNEY

UNITED STATES PATENT OFFICE.

JOSEPH HARRIS, OF CHICAGO, ILLINOIS, ASSIGNOR TO WILLIAM H. MINER, OF CHAZY, NEW YORK.

DRAW-BAR AND YOKE CONNECTION.

1,231,017.      Specification of Letters Patent.      Patented June 26, 1917.

Application filed September 2, 1915. Serial No. 48,596.

*To all whom it may concern:*

Be it known that I, JOSEPH HARRIS, a citizen of the United States, residing at Chicago, in the county of Cook and State of Illinois, have invented a certain new and useful Improvement in Draw-Bar and Yoke Connections, of which the following is a full, clear, concise, and exact description, reference being had to the accompanying drawings, forming a part of this specification.

This invention relates to improvements in draw-bar and yoke connections.

An object of the invention is to provide a simple and serviceable connection for a yoke to any M. C. B. type of a draw-bar, and this without the employment of rivets or coupler key.

In the drawing forming a part of this specification, Figure 1 is a side elevation of a draw-bar and yoke showing my improvement in connection therewith, one of the members of the hood being removed. Fig. 2 is a top plan view of the structure shown in Fig. 1. Fig. 3 is a vertical sectional view taken on the line 3—3 of Fig. 1. And Fig. 4 is a detail perspective of one of the members composing the connecting hood or head.

In said drawing, 10 denotes a draw-bar having the usual upper and lower shoulders 11 and 12, 13 a shock absorbing device indicated by dotted lines and 14 a front follower, the same being mounted within a U shaped loop or yoke strap 15. The arms 16 and 17 of the loop are provided at their forward ends with enlargements which, in the form shown in the drawing, are T shaped, as indicated at 18—18. Each of the T shaped heads 18 has the inner shoulder 19 thereof engaging the corresponding shoulder 11 or 12 of the draw-bar.

To secure the strap and draw-bar together I provide a hood or head which preferably comprises two like members A—A fitting over the sides of the draw-bar and having their meeting faces in a vertical plane extending longitudinally of the draw-bar at the center thereof, each of the members A comprising an outer side plate 20 and transversely extending upper and lower walls 21 and 22, each of the latter being recessed as indicated at 23—23 to receive the T heads 18—18. The two members A—A are detachably secured together by means of nuts and bolts 24—24 passing through suitable perforated ears 25—25 on the members A—A.

The manner of assembling the parts is as follows:

The draw-bar and yoke strap are first placed in position with the T heads engaging the shoulders of the draw bar. One of the members A is then slipped over the draw-bar and ends of the yoke strap after which the other member A is applied from the opposite side of the draw-bar. The two members A—A are then secured together by the bolts and nuts 24—24. In draft, it is apparent that the T heads 18—18 are well braced by the portions of the members A—A in back thereof and, of course, spreading of the yoke strap arms is prevented. In buff, the force is applied directly by the draw-bar butt to the follower 14.

I have herein shown and described what I now consider the preferred embodiment of my improvement but the same is merely illustrative. The broad concept of the invention involves a two piece connecting hood or head placed over the draw-bar from the sides thereof, as shown, with the head or connector thus formed having recesses within which are received enlargements on the ends of the yoke strap. The shoulders which engage the draw-bar shoulders 11 and 12 may be formed either on the ends of the yoke strap as herein illustrated or the connecting head may have its shoulders directly engaging draw-bar shoulders, as will be obvious to those skilled in the art.

I claim:

The combination with a shouldered draw bar and a U-shaped yoke strap having T-shaped heads at the forward ends of the arms thereof, the inwardly extending portions of said heads being adapted to engage the shoulders of the draw bar, of a two piece hood fitting over the sides of said draw bar and said heads, said pieces having recesses on the interior thereof fitting and accommodating said T-heads, and means, located above and below and independent of the draw bar, for detachably connecting said pieces together.

In witness that I claim the foregoing I have hereunto subscribed my name this 14th day of August, 1915.

JOSEPH HARRIS.